United States Patent

Brackmann et al.

[11] Patent Number: 5,810,423
[45] Date of Patent: Sep. 22, 1998

[54] AUTOMATIC WINDOW ACTUATOR FOR MOTOR-VEHICLE DOOR

[75] Inventors: Horst Brackmann; Kurt Raffelsiefer, both of Velbert; Clemens Tantow, Essen, all of Germany

[73] Assignee: Kiekert AG, Heiligenhaus, Germany

[21] Appl. No.: 751,361

[22] Filed: Nov. 18, 1996

[30] Foreign Application Priority Data

Dec. 20, 1995 [DE] Germany .................. 195 47 582.8

[51] Int. Cl.⁶ .................................................. B60J 1/08
[52] U.S. Cl. ........................... 296/146.2; 49/280; 49/72
[58] Field of Search ...................... 296/146.2, 146.16, 296/201; 49/279, 280, 502, 72

[56] References Cited

U.S. PATENT DOCUMENTS

| | | | |
|---|---|---|---|
| 4,478,004 | 10/1984 | Andrei-Alexandru et al. | 49/280 X |
| 4,571,884 | 2/1986 | Hetmann et al. | 49/280 X |
| 5,009,461 | 4/1991 | Smith-Horn et al. | 49/502 X |
| 5,535,607 | 7/1996 | Dzurko et al. | 70/277 X |
| 5,653,484 | 8/1997 | Brackmann et al. | 292/216 |

FOREIGN PATENT DOCUMENTS 41 07 271  9/1992  Germany .
0148615  6/1989  Japan ................................ 49/279

*Primary Examiner*—Dennis H. Pedder
*Attorney, Agent, or Firm*—Herbert Dubno; Andrew Wilford

[57] ABSTRACT

A motor vehicle has a body, a door movable on the body between an open and a closed position. and a body-mounted roof channel fixedly mounted on the body adjacent and above the door. A window is displaceable in the door between a down position below and clear of the channel and an up position fitting in the closed position of the door in the roof channel. A drive including a motor in the door displaces the window between its up and down positions. A latch has a bolt on the frame, a retaining element on the door engageable in the closed position of the door with the bolt and movable between a latched position capturing the bolt and retaining the door in the closed position and an unlatched position releasing the bolt and allowing the door to moved between the closed and open positions, and a mechanism in the door coupled to the retaining element and displaceable between an actuated position freeing the element to move into the freeing position and an unactuated position. A controller connected to the motor includes a switch actuatable by the mechanism on movement into the actuated position for displacing the window down out of the up position and actuatable by the retaining element on movement into the latched position for displacing the window into the up position.

6 Claims, 3 Drawing Sheets

AUTOMATIC WINDOW ACTUATOR FOR MOTOR-VEHICLE DOOR

FIELD OF THE INVENTION

The present invention relates to a motor-vehicle door. More particularly this invention concerns a system for automatically dropping and raising a window of the door to clear a roof channel when the door is opened and closed.

BACKGROUND OF THE INVENTION

In convertible or removable-hardtop cars the vehicle door carries a window that is a simple pane that can move between a lower position wholly recessed in the door and an upper position in which it projects upward from the upper edge of the door and fits against a seal carried on the car body and roof. This seal can be one-sided, that is so that the window bears inward against it, but such systems are generally problematic because they do not seal tightly, particularly at high travel speeds when the window is buffeted by strong air forces.

In other systems the upper edge of the window fits in a channel mounted on the vehicle body at the roof line. In order to open or close the door it is necessary to drop the window sufficiently that its upper edge can move horizontally relative to the roof channel. While some sealing is provided when the window is not driven upward all the way home, the operator of the vehicle is normally constrained to move the window up after closing the door to ensure good sealing, and to move it down before the door can be opened.

Some systems have been provided, for instance on the BMW 850i as described in U.S. Pat. No. 4,571,884, to raise and lower the window an increment during opening and closing to allow it to fit in and clear the roof channel, but they remain problematic and quite complex.

OBJECTS OF THE INVENTION

It is therefore an object of the present invention to provide an improved window-operating system for a motor-vehicle door.

Another object is the provision of such an improved window-operating system for a motor-vehicle door which overcomes the above-given disadvantages, that is which automatically lowers the window enough to clear a window channel when the door is opened and that automatically raises it fully after the door is closed.

SUMMARY OF THE INVENTION

A motor vehicle has a body, a door movable on the body between an open and a closed position, and a body-mounted roof channel fixedly mounted on the body adjacent and above the door. A window is displaceable in the door between a down position below and clear of the channel and an up position fitting in the closed position of the door in the roof channel. A drive including a motor in the door displaces the window between its up and down positions. A latch has a bolt on the frame, a retaining element on the door engageable in the closed position of the door with the bolt and movable between a latched position capturing the bolt and retaining the door in the closed position and an unlatched position releasing the bolt and allowing the door to moved between the closed and open positions, and a mechanism in the door coupled to the retaining element and displaceable between an actuated position freeing the element to move into the freeing position and an unactuated position. A controller connected to the motor includes a switch actuatable by the mechanism on movement into the actuated position for displacing the window down out of the up position and actuatable by the retaining element on movement into the latched position for displacing the window into the up position.

Thus according to the invention merely actuating the door-opening mechanism will drop the window so it clears the roof channel, but the window will not go back up again until the door is fully latched again. Thus the user need not take any particular steps when opening or closing the door on a convertible or removable-hardtop car. The window normally only has to be dropped a few centimeters, so this movement can be effected without normally having any noticeable effect on how fast the door can be opened. The unit can be built relatively easily into a standard door latch, merely by adding a single switch. The electronics of the standard controller can easily be set up to coact with the switch to effect the desired window movements.

According to the invention the mechanism includes a release lever directly coupled to the switch. The retaining element includes a cam edge operatively engageable with the switch in the unlatched position of the element. A switch lever operable by the mechanism and retaining element is connected to the switch for actuating same.

More particularly according to the invention the mechanism includes an actuating lever, a release lever having a cam formation engageable with the switch lever, a coupling between the actuating and release levers, and a locking lever connected to the coupling and operable to move same and disconnect the actuating lever from the release lever. The switch lever is pivoted at one end on the latch and has an opposite end engageable with the switch. The switch lever and retaining element have mutually engageable cam formations for actuating the switch. The switch raises the window to the up position when released by the cam formation of the retaining element as the retaining element moves into the latched position.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
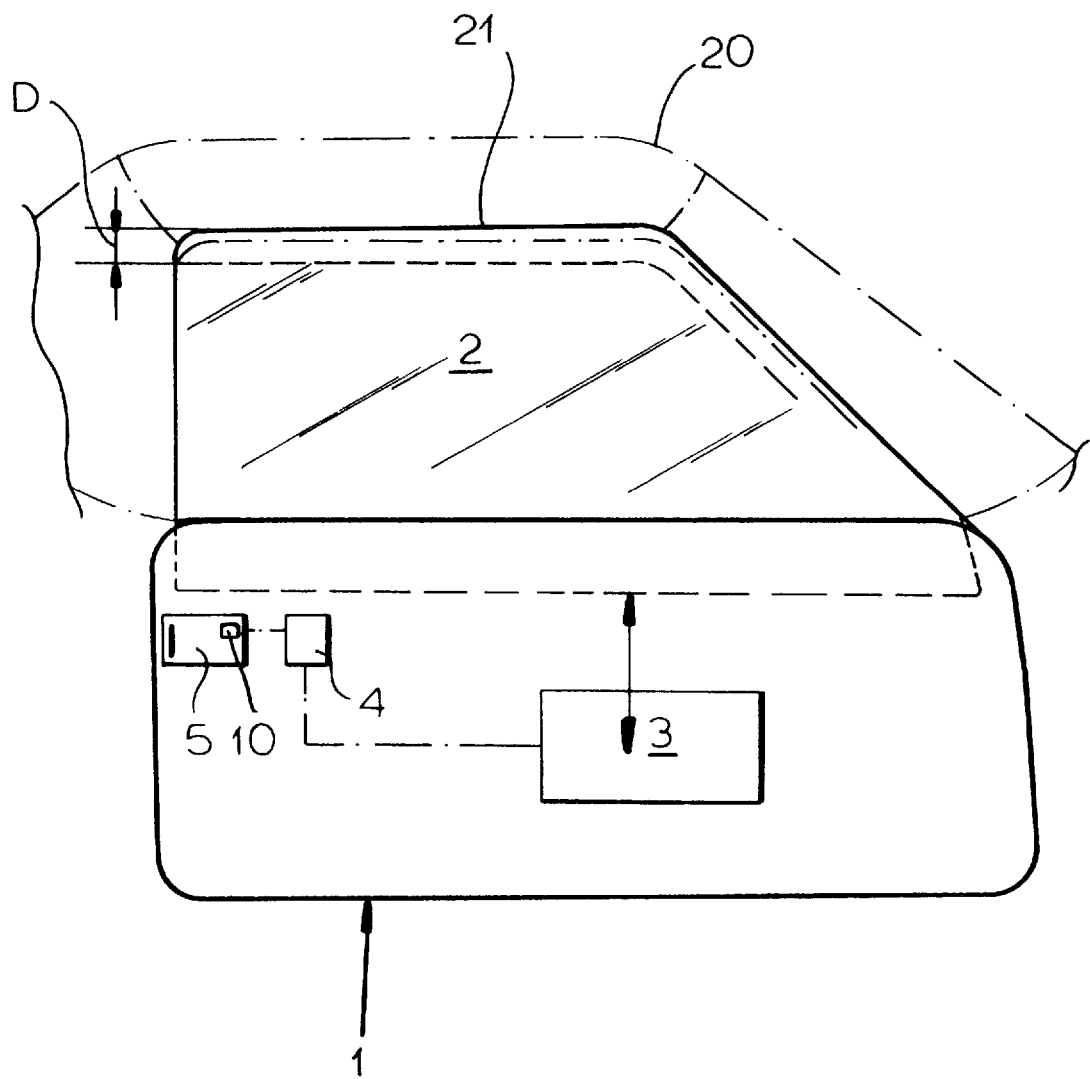
FIG. 1 is a largely schematic view of a motor-vehicle door according to the invention.

As seen in FIG. 1 a motor vehicle has a door 1 and a body 20. The door 1 carries a window 2 that can be displaced vertically by an electric-motor drive 3 operated by an electrical or electronic controller 4. In addition the door 1 has a standard door latch 5 of the type described in copending application Ser. No. 08/647,440 (now U.S. Pat. No. 5,653,484) and the art cited therein. The window 2 fits in an upper position into a roof channel 21 that may be part of a convertible or removable-hardtop roof. When the window 2 is engaged in the channel 21, the door 1 cannot be opened, and when the window 2 is all the way up, the door 1 cannot be closed. This window 2 must be moved down through an increment D to clear the channel 21 to allow the door 1 to be opened and closed.

Figure 2:
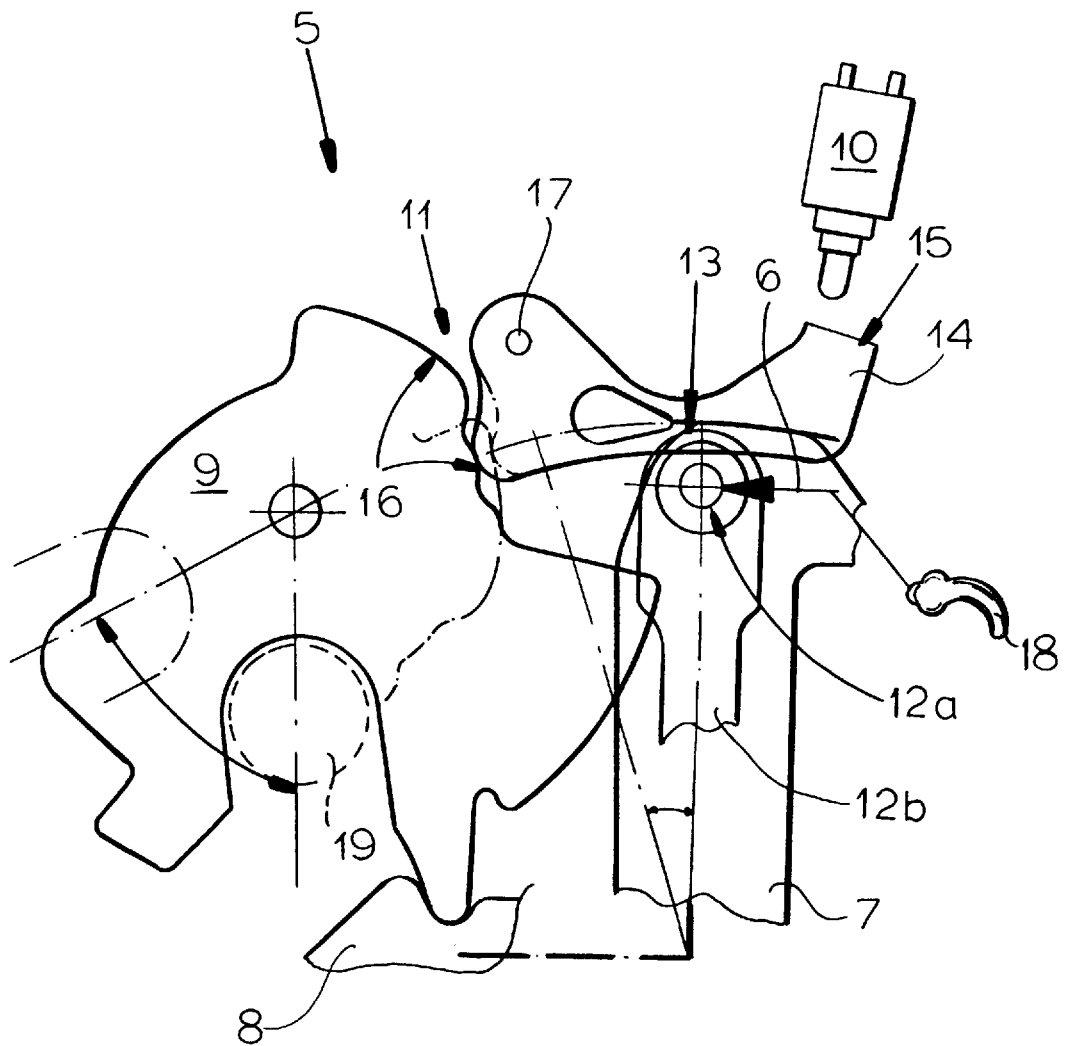
FIG. 2 is a large-scale view of details of the latch of the motor-vehicle door in the latched position.
Figure 3:
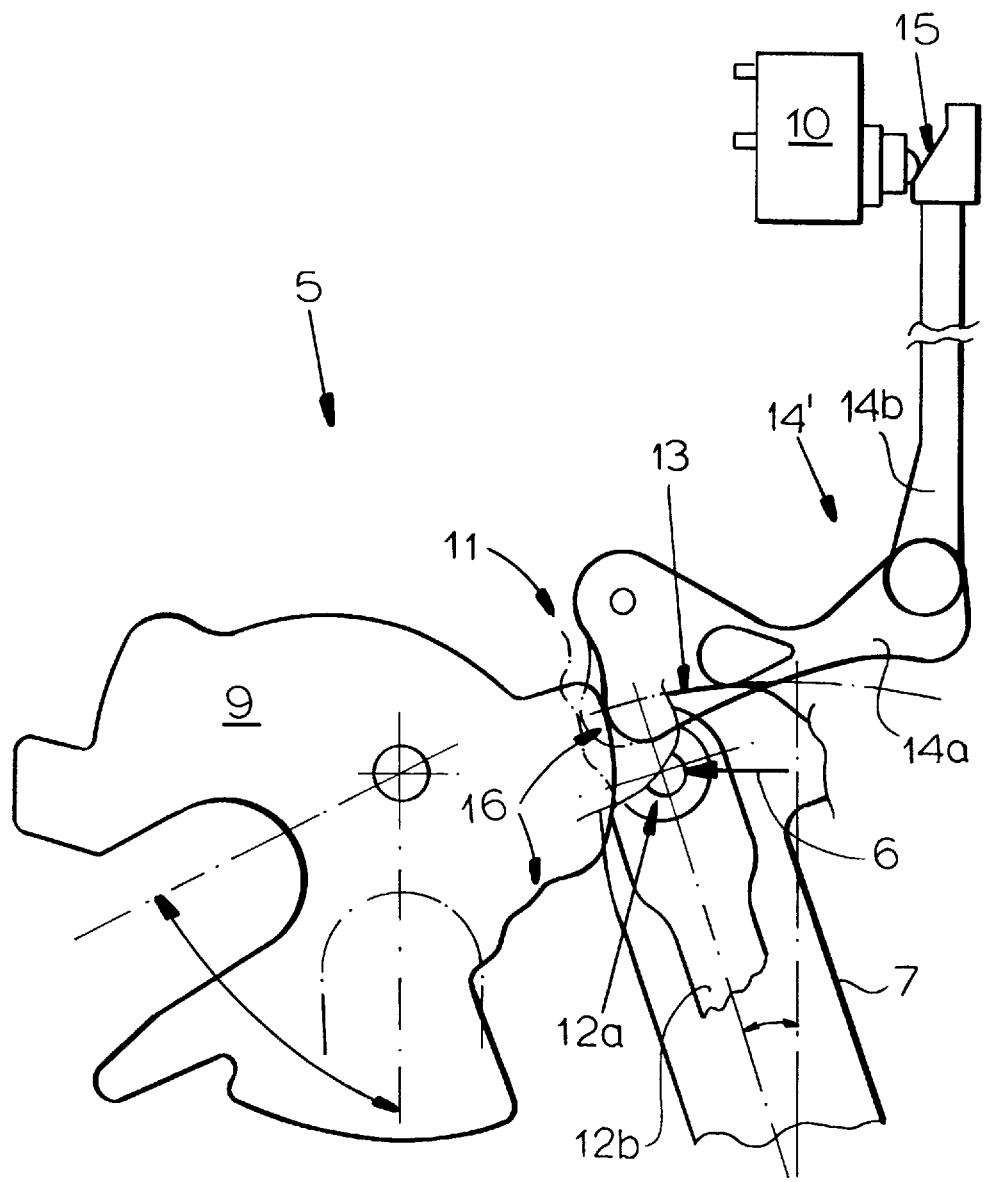
FIG. 3 is a view like FIG. 1 of variation on the mechanism of FIG. 2 in the unlatched position.

As shown in more detail in FIGS. 2 and 3 the latch 5 has a schematically illustrated actuating lever 6 that is operated by inside and outside door handles one of which is shown at 18. This actuating lever 6 is connected via a coupling 12a to a standard release lever 7 that in turn operates a pawl 8. A retaining element or fork 9 can engage around a post-mounted door bolt 19 to latch the door 1. The pawl 8 is operated by the release lever 7 and serves to retain the fork 9 in the latched position shown in FIG. 2.

The electrical controller 4 has an additional control switch 10 responsible for dropping the window 2 on opening and raising it on closing of the door 1. The switch 10 is set to be actuated when one of the elements of the mechanism formed by the actuating lever 6, release lever 7, pawl 8, or fork 9 is moved so as to unlatch the door 1. When the switch 10 is actuated the drive 3 drops the window through the increment D. The electrical controller 4 is effective through the drive 3 to raise the window 2 as soon as the fork 9 is returned on closing of the door 1 to the fully closed position, that is the FIG. 2 latched position of the fork 9. The switch 10 is here operated on opening of the door 1 by the release lever 7. Holding formations 11 are provided to maintain the switch 10 actuated so long as the retaining element or fork 9 is not in the latched position.

As shown in FIGS. 2 and 3 the mechanism 6, 7, 8, 9 further has a coupling 12a which controls the downwardly projecting locking lever 12b of the unillustrated locking system operated normally by a button on the inside of the door 1 and a lock cylinder on the outside of the door 1. The lever 12b is here part of the locking system and in the unlocked position connects the actuating lever 6 with the release lever 7. The coupling lever 12a has a coupling pin which engages through cutouts in the actuating lever 6 and in the release lever 7. In the unlocked position it coacts with the outside actuating handle. In the locked position the outside handle is decoupled so that when actuated it does not affect the latch 5. In addition the actuating lever 6 is L-shaped and the other lever 7 has an L-shaped cutout which is so oriented that in the locked position the actuating lever 6 is decoupled and in the unlocked position the actuating lever 6 is coupled to the release lever 7.

In this embodiment the release lever 7 is also L-shaped and has one leg that acts on a pin of the pawl 8 and another leg having a longitudinally extending slot for the coupling 12a. The release lever 7 further has a camming formation or edge 13 that acts via a switch lever 14 pivoted at one end at 17 and engageable with the switch 10. The switch lever 14 has at its end opposite the pivot 17 a camming edge or formation 15 directly engageable with the control switch 10. In addition this lever 14 is engageable with a cam edge or formations 16 on the fork 9 constituting the holding formations 11. The controller 4 raises the window 2 as soon as the switch 10 is released by the formation 16 of the fork 9.

The release lever 7 is moved for example by actuation of the inside or outside handle 18 so as to act with its formation 13 on the lever 14. This action will operate the switch 10 and cause the window 2 to be dropped down by the motor drive 3. If the handle 18 is released, the window 2 nonetheless is maintained down, even if the door 1 is not opened. As a result the lever 14 must be held in the actuated position by the holding formations 11.

FIG. 2 shows an arrangement where the formations 11 hold the lever 14 mechanically. If the fork 9 is moved back into the latched position by closing of the door 1, the edge 16 releases the lever 14. Since the release lever 7 is not actuated on closing of the door 1 the switch lever 14 can therefore return to the position in which it releases the switch so that the window 2 is lifted again and seated in the roof molding.

In FIG. 3 the single lever 14 is replaced by a lever system 14' comprising a lever 14a substantially identical to the lever 14 and pivoted to a pusher rod 14b having an end edge 15 that actuates the switch 10.

We claim:

1. In combination with a motor vehicle having a body and a door movable on the body between an open and a closed position, a body-mounted roof channel fixedly mounted on the body adjacent and above the door;

a window displaceable in the door between a down position below and clear of the channel and an up position fitting in the closed position of the door in the roof channel;

drive means including a motor in the door for displacing the window between its up and down positions;

a latch including
a bolt on the body,
a retaining element on the door engageable in the closed position of the door with the bolt and movable between a latched position capturing the bolt and retaining the door in the closed position and an unlatched position releasing the bolt and allowing the door to moved between the closed and open positions, and
a mechanism in the door including a release lever, coupled to the retaining element and displaceable between an actuated position freeing the element to move into the freeing position and an unactuated position;

control means connected to the motor and including a switch actuatable by the release lever of the mechanism on movement into the actuated position for displacing the window down out of the up position and actuatable by the retaining element on movement into the latched position for displacing the window into the up position.

2. The combination defined in claim 1 wherein the retaining element includes a cam edge operatively engageable with the switch in the unlatched position of the element.

3. The combination defined in claim 1 further comprising a switch lever operable by the mechanism and retaining element and engageable with the switch for actuating same.

4. The combination defined in claim 3 wherein the switch lever is pivoted at one end on the latch and has an opposite end engageable with the switch.

5. The combination defined in claim 3 wherein the switch lever and retaining element have mutually engageable cam formations for actuating the switch.

6. The combination defined in claim 3 wherein the switch raises the window to the up position when released by the cam formation of the retaining element as the retaining element moves into the latched position.

* * * * *